(12) United States Patent
Fowler et al.

(10) Patent No.: US 8,817,145 B2
(45) Date of Patent: Aug. 26, 2014

(54) HYBRID CCD—CMOS CAMERA ADAPTED FOR FORMING IMAGES OF MOVING SCENES

(75) Inventors: Boyd Fowler, Sunnyvale, CA (US); Xinqiao Liu, Mountain View, CA (US); Steven Onishi, San Jose, CA (US)

(73) Assignee: BAE Systems Imaging Solutions Inc., Milpitas, CA (US)

( * ) Notice: Subject to any disclaimer, the term of this patent is extended or adjusted under 35 U.S.C. 154(b) by 284 days.

(21) Appl. No.: 13/436,267

(22) Filed: Mar. 30, 2012

(65) Prior Publication Data

US 2013/0258153 A1 Oct. 3, 2013

(51) Int. Cl.
*H04N 5/335* (2011.01)
*H04N 7/18* (2006.01)

(52) U.S. Cl.
USPC ........... 348/294; 348/295; 348/308; 348/143; 348/144

(58) Field of Classification Search
USPC .......................... 348/294, 295, 308, 143, 144
See application file for complete search history.

(56) References Cited

U.S. PATENT DOCUMENTS

| 6,433,326 | B1 * | 8/2002 | Levine et al. | 250/208.1 |
| 2005/0082582 | A1 * | 4/2005 | Rhodes | 257/291 |
| 2008/0079830 | A1 * | 4/2008 | Lepage | 348/295 |

* cited by examiner

*Primary Examiner* — Twyler Haskins
*Assistant Examiner* — Quang Le
(74) *Attorney, Agent, or Firm* — Calvin B. Ward

(57) ABSTRACT

A camera adapted for taking pictures of a moving scene is disclosed. The camera includes an imaging array, a plurality of charge-coupled device (CCD) shift registers, and a controller. The imaging array includes a plurality of CMOS pixel sensors organized as a plurality of columns and rows. The image moves in the column direction. One CCD shift register corresponds to each of the columns. Each CMOS pixel sensor includes a first transfer gate that transfers charge accumulated in the pixel sensor to a corresponding cell in the CCD shift register. The controller controls the CCD shift registers such that charge stored in a first cell in a CCD shift register is moved to a second cell in the CCD shift register where the charge is combined with charge accumulated by the pixel sensor that is connected to the second cell, the combined charge being generated from the same image pixel.

22 Claims, 9 Drawing Sheets

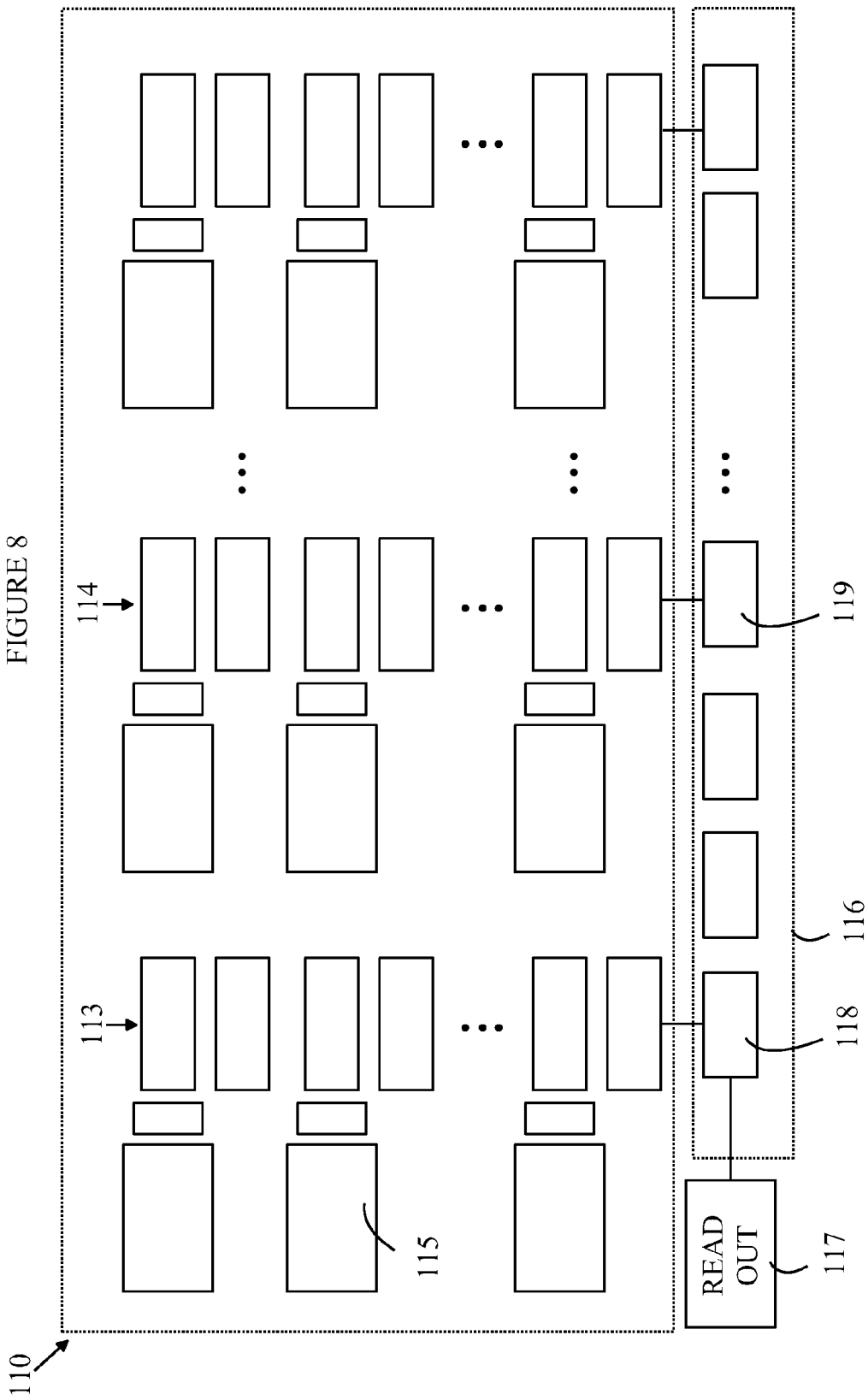

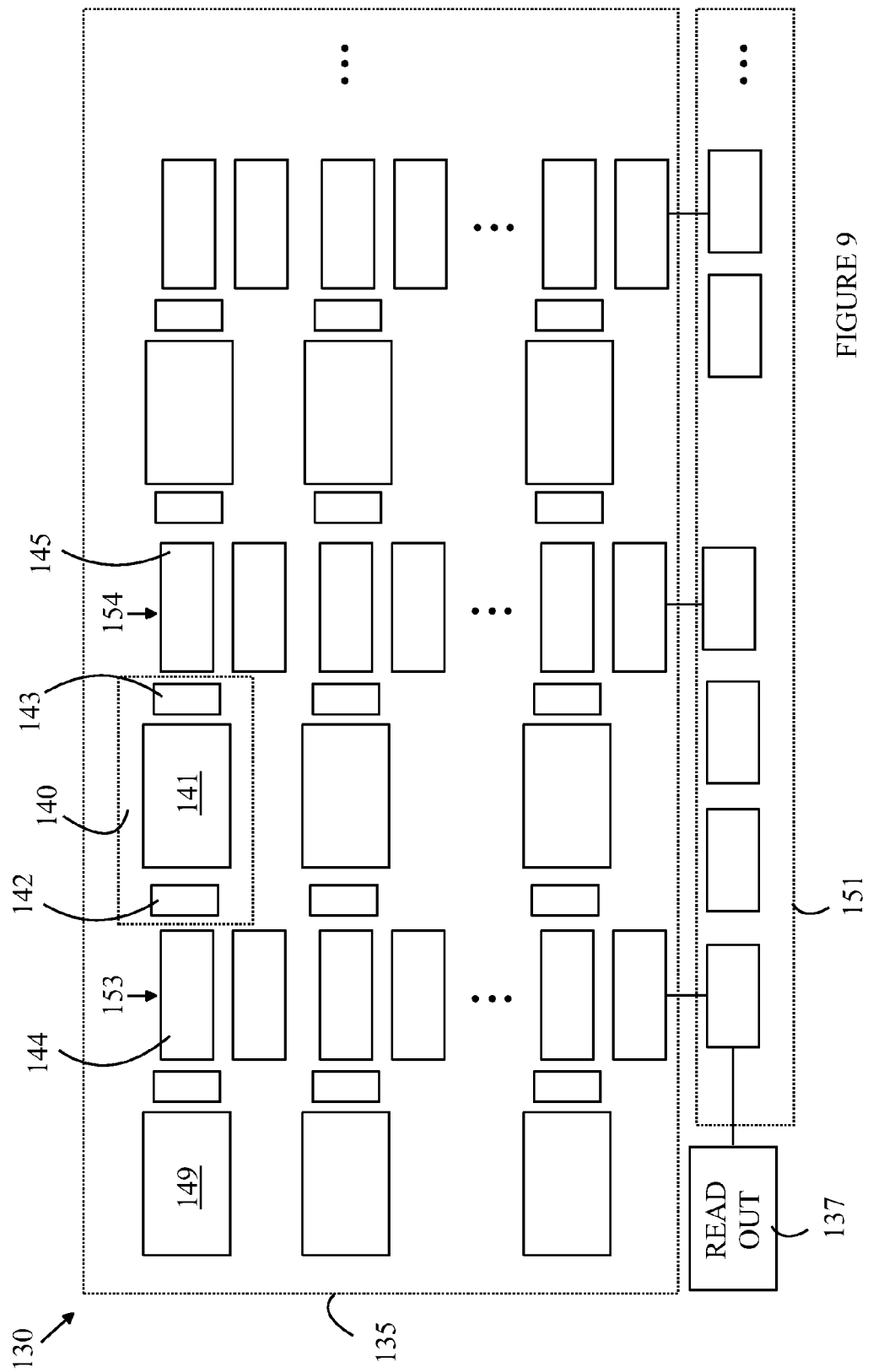

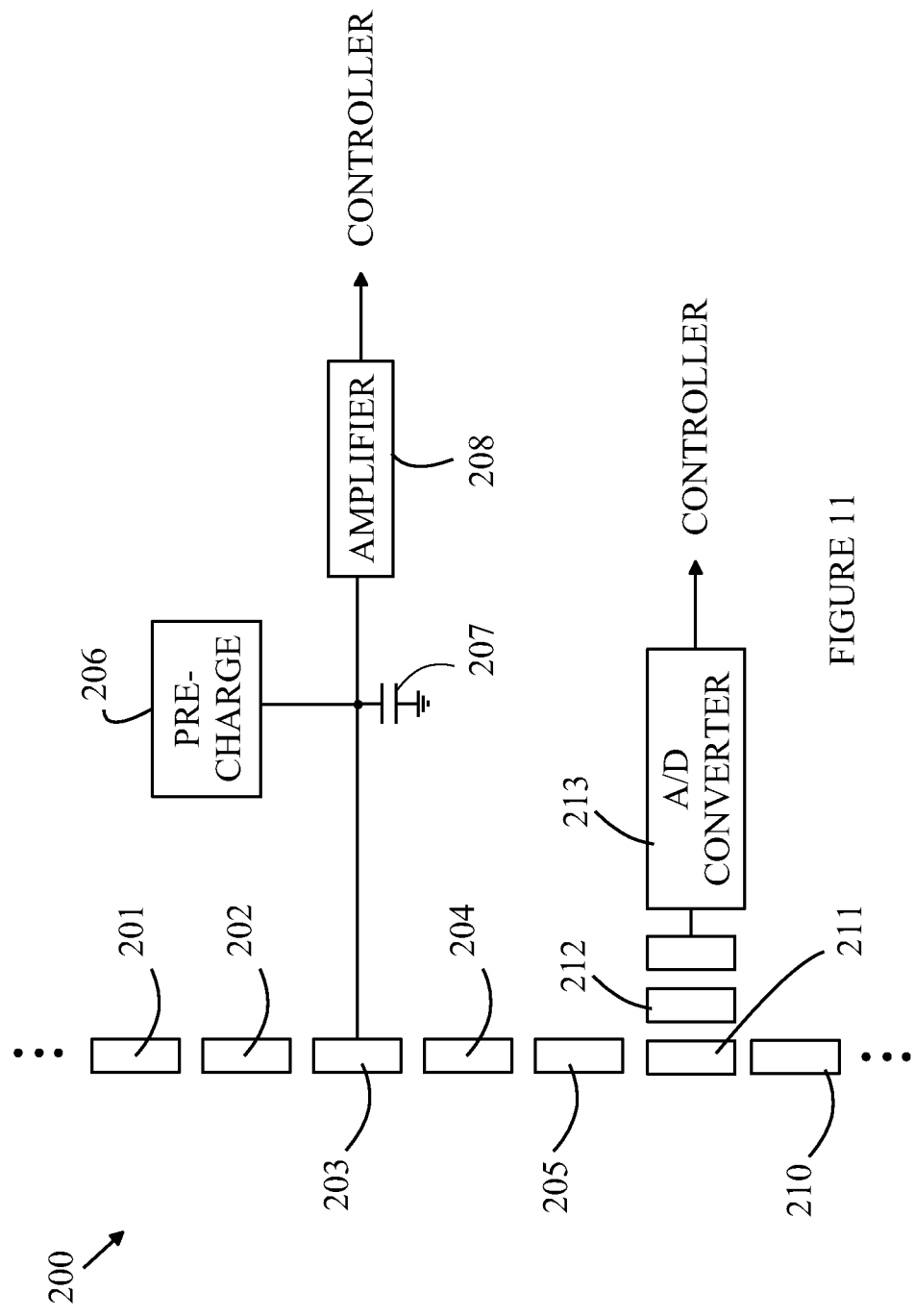

HYBRID CCD—CMOS CAMERA ADAPTED FOR FORMING IMAGES OF MOVING SCENES

BACKGROUND OF THE INVENTION

There are a number of situations in which an image of a scene that is moving with respect to the camera is required. One solution to this problem involves forming a number of sub-images in which each image is taken with the camera at a different position relative to the scene. The various sub-images typically overlap one another to some extent. The overlap is then used to combine the sub-images to produce the larger desired image.

Aerial photographic surveys typically utilize such a solution to generate an aerial view of a large geographic area that could not be photographed at the desired resolution in a single photograph. Typically, a camera is mounted on the underside of an aircraft that flies a predetermined pattern over the terrain to be photographed. Images are formed at predetermined intervals and combined later to provide the desired image.

The individual photographs must be taken under constraints imposed by the relative motion of the camera and the scene being photographed and by the lack of an auxiliary light source to improve the exposure. To prevent blurring of the image, the effective shutter speed must be very high. This constraint, in turn, limits the light that is available for any given exposure. The limited light cannot be augmented by an external light source such as a flash. Even in relatively bright daylight conditions, details in the shadows of trees or other objects may be lost due to the lack of light from these regions. Furthermore, the low light levels cannot be augmented by increasing the f-stop of the camera, since there is a minimum depth of field that is required for each photograph and that depth of field is determined by the variations in the terrain, not by the photographer.

In principle, the sensitivity of the camera can be increased by utilizing large lenses that collect more light. However, economic constraints limit this solution to the problem.

Another potential solution utilizes a scheme in which the overlap between the various images is increased so that each area on the final image is seen in a number of individual sub-images. The data for each pixel is then provided by combining the measurements from the corresponding sub-images, and hence, effectively increasing the exposure time.

However, there is a limit on the number of sub-images that can be taken. In digital photography, the image is projected onto an imaging array consisting of an array of individual light sensing elements that convert the light striking that element to an electric charge that is subsequently readout and digitized. The imaging array typically has several million sensing elements, and hence, the time to readout the imaging array into an associated memory for storage limits the number of frames that can be taken. In addition, the amount of high-speed memory needed to store all of the individual images increases the cost of the system. Finally, the substantial post photographic imaging processing needed to combine the various images to provide the desired composite image also presents substantial economic limitations on such solutions.

In addition, schemes in which the individual images are readout and digitized suffer from increased noise. In addition to the noise arising from the limited number of photons that are converted for each sub-image, each sub-image is also subjected to readout noise when the sub-image is readout and digitized.

SUMMARY OF THE INVENTION

The present invention includes a camera and method for operating the same. The camera includes an imaging array, a plurality of charge-coupled device (CCD) shift registers, and a controller. The imaging array includes a plurality of CMOS pixel sensors organized as a plurality of columns and rows, the columns being characterized by a column direction. Each pixel sensor generates a charge in response to an exposure to part of an image The imaging array receives the image which moves across the imaging array in the column direction.

The CCD shift registers include one CCD shift register corresponding to each of the columns. Each CMOS pixel sensor includes a first transfer gate that transfers charge accumulated in the pixel sensor to a corresponding cell in the CCD shift register corresponding to the column associated with that pixel sensor. The controller controls the CCD shift registers such that charge stored in a first cell in a CCD shift register is moved to a second cell in the CCD shift register where the charge is combined with charge accumulated by the pixel sensor that is connected to that second cell, the combined charge being a measure of the light leaving a common location in the moving image.

BRIEF DESCRIPTION OF THE DRAWINGS

FIG. 8 illustrates a portion of an imaging array according to one embodiment of the present invention in which the readout circuitry includes a horizontal CCD shift register.

FIG. 9 illustrates another embodiment of an imaging array according to the present invention.

FIG. 11 illustrates a section of a CCD shift register according to another embodiment of the present invention.

DETAILED DESCRIPTION OF PREFERRED EMBODIMENTS

Figure 1:
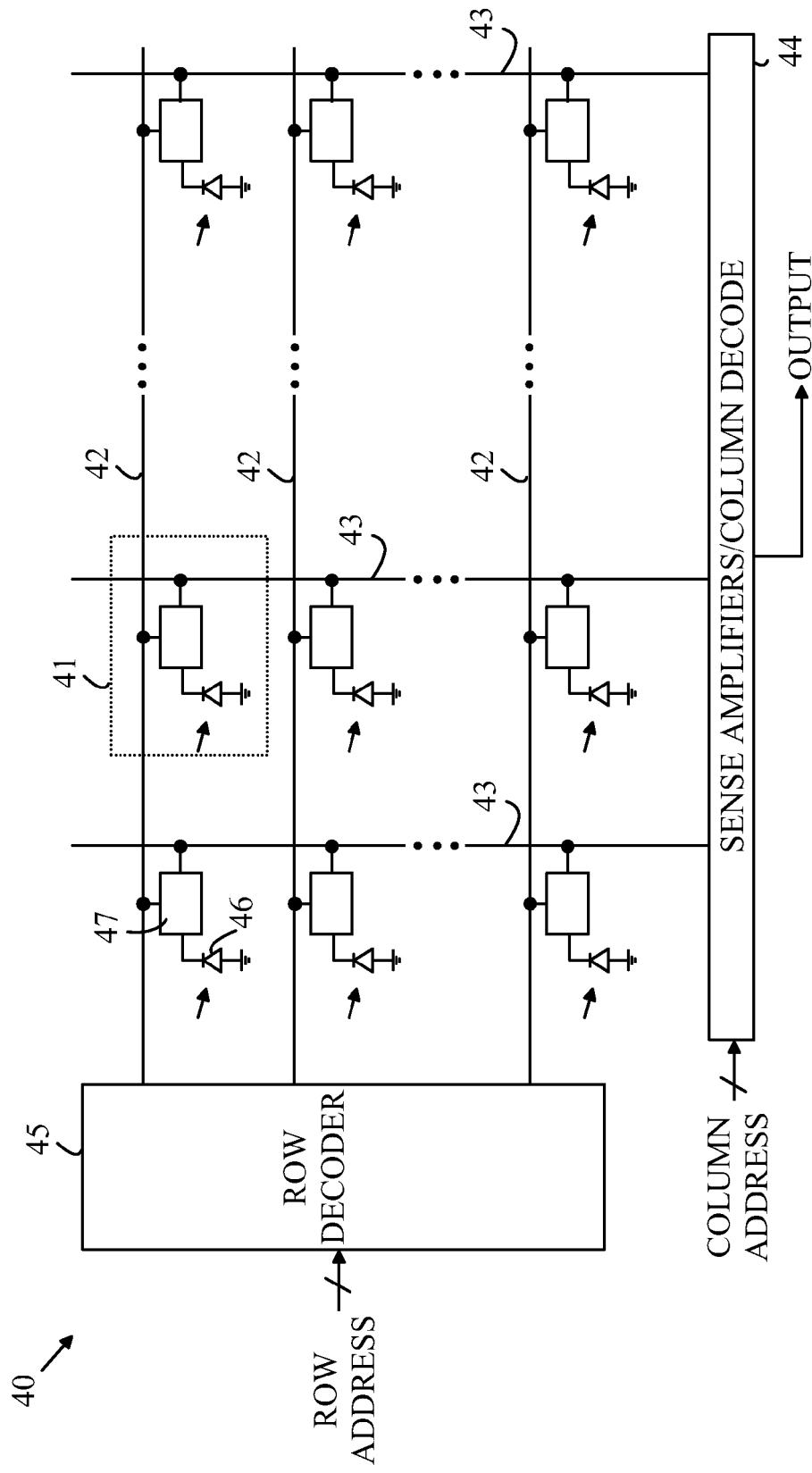
FIG. 1 is a schematic drawing of a prior art CMOS imaging array.

The manner in which the present invention provides its advantages can be more easily understood with reference to FIG. 1, which is a schematic drawing of a prior art CMOS imaging array. Imaging array 40 is constructed from a rectangular array of pixel sensors 41. Each pixel sensor includes a pinned photodiode 46 and an interface circuit 47. The details of the interface circuit depend on the particular pixel design. However, all of the pixel sensors include a gate that is connected to a row line 42 that is used to connect that pixel sensor to a bit line 43. The specific row that is enabled at any time is determined by a row address that is input to a row decoder 45. The row select lines are a parallel array of conductors that run horizontally in the metal layers over the substrate in which the photodiodes and interface circuitry are constructed.

The various bit lines terminate in a column processing circuit 44 that typically includes sense amplifiers and column decoders. The bit lines are a parallel array of conductors that run vertically in the metal layers over the substrate in which the photodiode and interface circuitry are constructed. Each sense amplifier reads the signal produced by the pixel that is currently connected to the bit line processed by that sense amplifier. The sense amplifiers may generate a digital output signal by utilizing an analog-to-digital converter (ADC). At any given time, a single pixel sensor is readout from the imaging array. The specific column that is readout is determined by a column address that is utilized by a column decoder to connect the sense amplifier/ADC output from that column to circuitry that is external to the imaging array.

As noted above, schemes in which the moving image is accommodated by reading out sub-images and then shifting and combining the sub-images suffer from a number of problems. First, the sub-images must be readout in a time that is less than or equal to the time the image moves a distance corresponding to one row of pixels sensors in the imaging array. Since each row is readout in sequence, the readout time is N times the time needed to readout a single row pixel sensor. Here, N is the number of rows in the imaging array. Hence, very high speed computing resources are needed. Second, the readout process requires that the charge accumulated on each photodiode be converted to a voltage and digitized. This conversion process introduces noise into the sub-image. This noise is particularly problematic in low light regions of the image. The present invention avoids these readout noise problems while preserving the advantages of CMOS pinned photodiode pixels.

The present invention overcomes this problem by providing a mechanism in which the charge from each sub-image is accumulated prior to converting the charge to a voltage and digitizing that voltage. In one aspect of the present invention, the bit lines discussed above are replaced by CCD shift registers. The photocharge accumulated in each photodiode during a sub-image is transferred to a cell of the CCD shift register where it is combined with the charge generated in prior sub-images at the same location in the image. As the image moves across the imaging array, the charges stored in the CCD shift registers are shifted one row in the direction of motion of the image. During each shifting operation, the charge corresponding to one line in the image is shifted off the end of the CCD shift registers represents the sum of N sub-images for that line. This charge is then converted to a digital value, typically by converting the charge to a voltage that is then digitized.

The shifting and adding of charge in the CCD shift registers does not introduce significant readout noise into the image. Hence, the readout noise is determined by the final charge conversion at the end of the shift register. Hence, the image is only subjected to noise from one readout as opposed to N readouts. In addition, the charge that is being readout is N times the charge that would be readout at each sub-image, and hence, is less subject to other noise sources that depend on the number of electrons in the charge.

Figure 2:
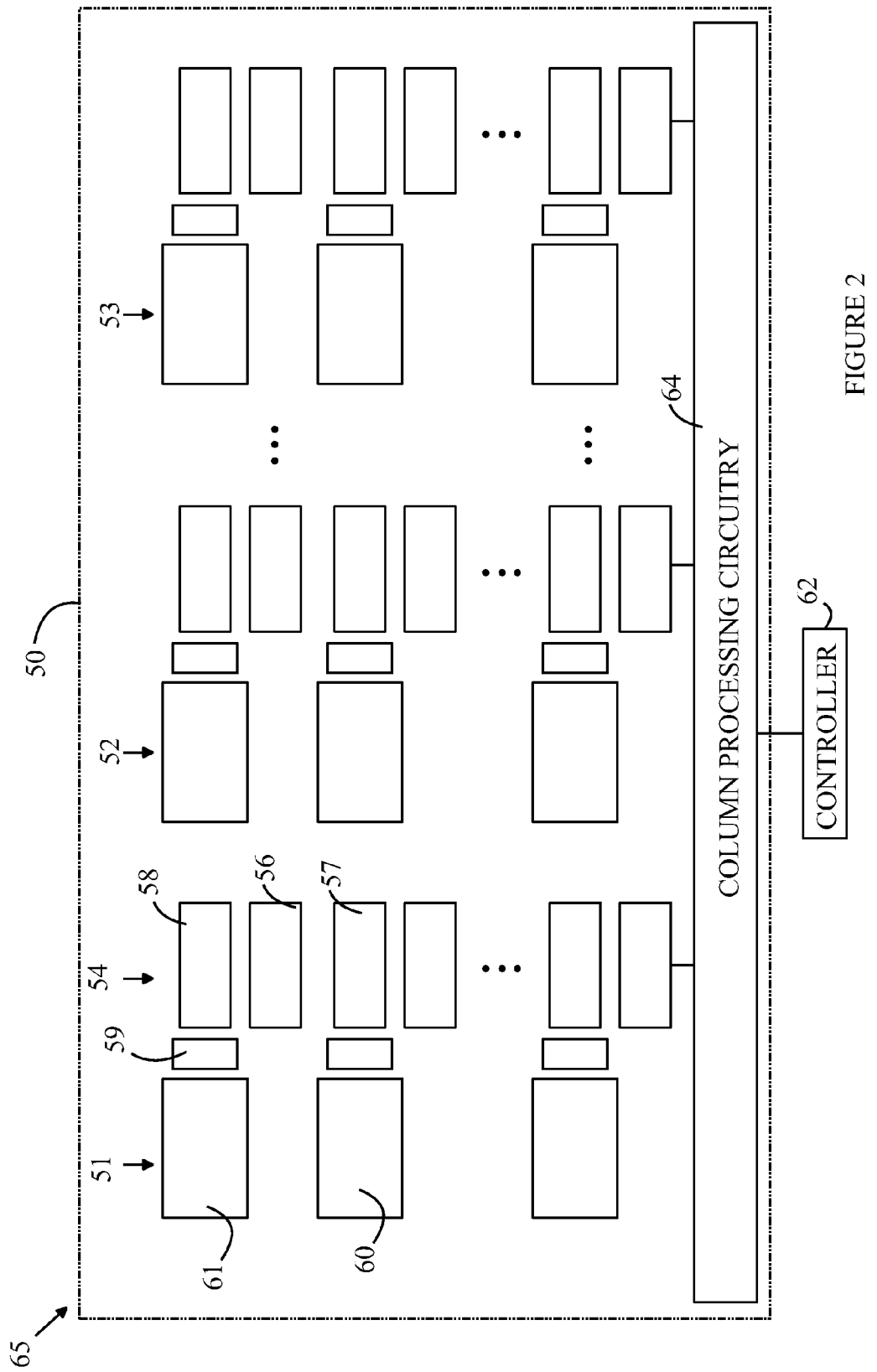
FIG. 2 illustrates one embodiment of a camera according to the present invention.

Refer now to FIG. 2, which illustrates one embodiment of a camera according to the present invention. Camera 65 includes an imaging array 50, and a controller 62. Imaging array 50 is organized as a plurality of rows and columns of pixel sensors. Each pixel sensor includes a photodiode, such as photodiode 61, a transfer gate such as transfer gate 59, and a corresponding cell of a CCD shift register. The CCD shift register cell corresponding to photodiode 61 is shown as CCD shift register cell 58. Typical columns of photodiodes are shown at 51-53.

The CCD shift registers utilize a buried channel having a number of polysilicon electrodes deposited on a thin oxide layer over the channel. The CCD shift register can be viewed as series of shifting cells whose boundaries are governed by the potentials applied to these gates. The number of gates per cell depends on the particular CCD shift register design and can vary from two gates to four gates. To simplify the drawings, only the overlying electrodes are shown in the drawings. The various connections for providing clocking voltages to these electrodes have been omitted from the drawings. In the example shown in FIG. 2, each cell has two electrodes; however, embodiments having more electrodes could also be utilized.

The image is created by combining the results of a number of exposures, typically one exposure for each row of pixel sensors in imaging array 50. The exposure time is substantially equal to the time needed for the image to move a distance equal to one row of pixel sensors in a direction parallel to the columns of pixel sensors.

During any given exposure, charges accumulate in the photodiodes. That charge is transferred to the corresponding cell of the CCD shift register associated with that photodiode at the end of the exposure. The transfer of the charge resets the photodiode, since all of the accumulated charge is moved to the cell of the CCD shift register. The charge that is transferred is added to any charge that is already in the cell of the CCD shift register at the time of the transfer. Thus, the charge in photodiode 61 is transferred through transfer gate 59 to CCD shift register cell 58 of shift register 54. Prior to the next exposure, the charge in CCD shift register cell 58 is transferred to CCD shift register cell 57 via CCD shift register electrode 56. At the end of the next exposure, the charge accumulated in photodiode 60 is transferred to CCD shift register cell 57 where it is added to the charge that was transferred into CCD shift register cell 57 from CCD shift register cell 58 at the end of the previous exposure.

Assuming that the shifting of the charge in the CCD shift register cells is properly synchronized with the motion of the image across the imaging array, the charge that is shifted into column processing circuitry 64 at each shift will be the sum of the charge accumulated over N exposures for the line of the image that has just shifted off of the imaging array. Here, N is the number of rows in the imaging array. Since the shifting of the charge along the CCD shift register is essentially a lossless process and noise is not introduced by the shifting operation, the noise problems discussed above are substantially eliminated.

Figure 4:
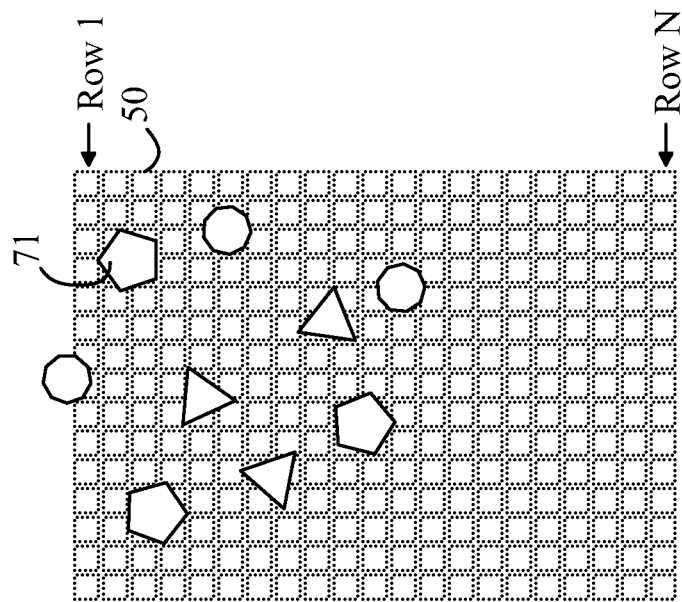
FIGS. 3 and 4 illustrate the motion of an image across an imaging array at two times at which the shutter is activated to capture image data.
Figure 3:
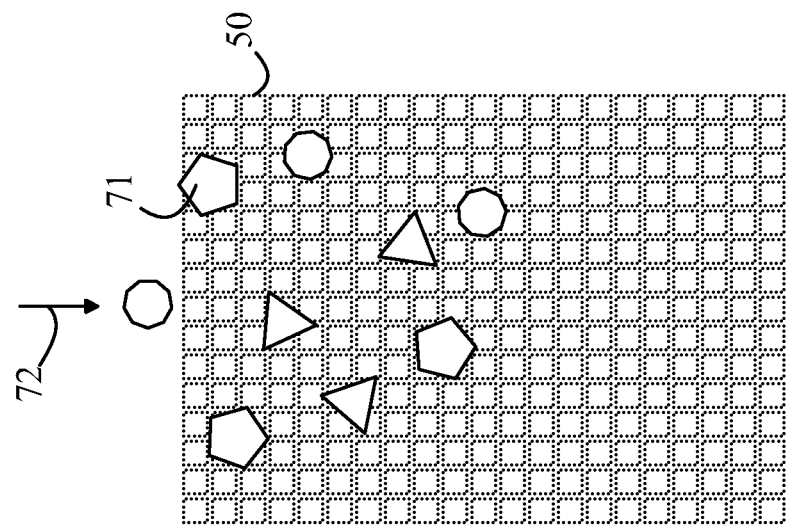

Refer now to FIGS. 3 and 4, which illustrate the motion of an image across imaging array 50 at two times in the image generation process. In this illustration, the scene is composed of a number of objects such as object 71. The scene moves relative to imaging array 50 in the direction shown by arrow 72.

The image acquisition process operates by coordinating the operation of reading out the pixel sensors with the shifting of the image in imaging array 50. Assume that the image is positioned relative to imaging array 50 as shown in FIG. 3 at the start of an exposure. The exposure terminates when the corresponding portion of the image shifts down to the next row of pixel sensors. After the exposure is complete, contents of each pixel sensor are added to the corresponding shift register cell and the data from the exposure is moved to the next row in the imaging array by shifting the contents of the shift register cells one row in the direction of the motion of the image. During this time, the image is moving relative to imaging array 50. When the image has moved a distance corresponding to one row of pixel sensors as shown in FIG. 4, the charge that was stored in the photodiodes of each row will have been moved to the adjacent row. The charge from the current exposure is then outputted and added to that already in the shift register cells. Hence, the charge in the previous exposure is added to the charge of the current exposure.

Denote the signal from $j^{th}$ pixel in the $i^{th}$ row of the image in the $k^{th}$ exposure by $^kI_{i,j}$. Here, i runs from 1 to N and j runs from 1 to M, where M is the number of columns of the imaging array. Here, the first row is the first row in the imaging array that the image of an object encounters as the image moves over the imaging array. The first and $N^{th}$ rows are labeled in FIG. 4. Consider the case in which two successive exposures are taken separated by a time equal to the time needed for the image to move one row over the imaging array. The data from $(i-1)^{th}$ row of pixels will have been transferred to the CCD shift register cells associated with the $i^{th}$ row of pixels. At the end of the next exposure, the charge accumulated by the photodiodes in each row is added to that in the CCD shift register cell associated with that row. Hence, at the end of the $k^{th}$ exposure, $^kI_{i,j}={}^{k-1}I_{i-1,j}+{}^kd_{i,j}$, where $^kd_{i,j}$ is the photocharge generated in the $(i,j)^{th}$ photodiode during the current $k^{th}$ exposure. The charge that was in the $N^{th}$ row of the imaging array at the end of each exposure is shifted off the array into the readout circuitry. Thus, each row of the image is the sum of all of the N exposures of the corresponding image line.

As noted above, each of the CCD shift registers terminates in the column processing circuitry shown at 64 in FIG. 2. Any charge-to-voltage converter that can be implemented in the CMOS process used to fabricate the photodiodes can, in principle, be used to process the charge that is shifted off the end of the CCD shift registers.

Figure 5:
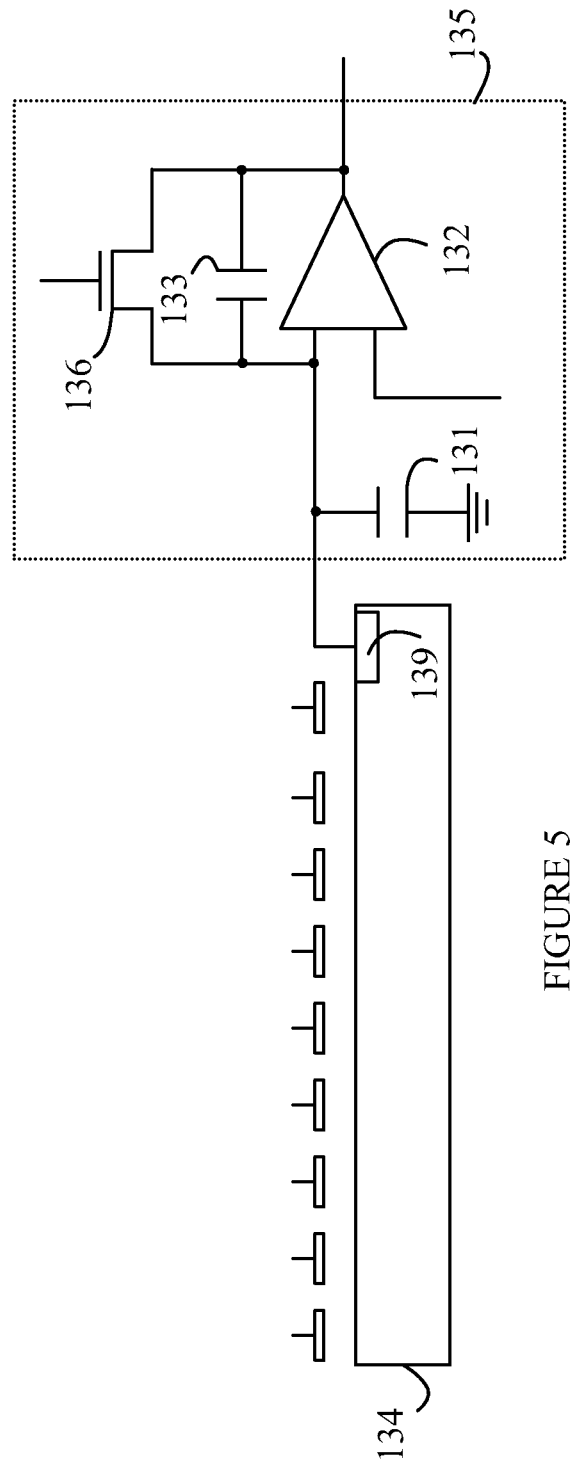
FIG. 5 illustrates one embodiment of a charge readout circuit that can be utilized in the column processing circuitry.

Refer now to FIG. 5, which illustrates one embodiment of a charge readout circuit that can be utilized in the column processing circuitry. Readout circuit 135 processes charge shifted off of CCD shift register 134 which is shown in cross-section. The CCD shift register includes an implant of a second conductivity type in a region of a semiconductor of a first conductivity type in which the electric fields along the implant are set by the potentials on electrodes that overlie the implant region. The charge shifted off of the last stage of CCD shift register 134 is delivered to a floating diffusion node 139 that is connected to the input of a capacitive trans-impedience amplifier (CTIA) constructed from amplifier 132 and feedback capacitor 133. The parasitic capacitance of floating diffusion node 139 and the input to amplifier 132 are represented by capacitor 131. Prior to transferring the charge to floating diffusion node 139, the voltage at the input to amplifier 132 is reset using switch 136. When charge is transferred to capacitor 131, the voltage on floating diffusion node 139 is altered to a value determined by its reset value, the capacitance of capacitor 131, and the amount of charge that is transferred. That charge is subsequently transferred on to feedback capacitor 133 after the amplifier 132 settles and voltage on floating diffusion node 139 goes back to its reset value. Readout circuit 135 is implemented in the same CMOS fabrication scheme as used to implement the photodiodes; hence, readout circuit 135 can be implemented on the same substrate as the CCD shift registers and the pinned photodiodes.

The output of amplifier 132 can be processed to compensate for variations in the reset voltage on floating diffusion node 139. This type of processing is often referred to as correlated double sampling. After floating diffusion node 139 is reset but prior to charge being transferred to floating diffusion node 139, the output of amplifier 132 is measured and stored. Charge is then transferred to floating diffusion node 139 and the output of amplifier 132 is again measured. The stored measurement is then subtracted from this latter measurement to compensate for variations in the reset voltage. The difference between the two values is then digitized to provide the intensity value for the corresponding point in the image.

Figure 6:
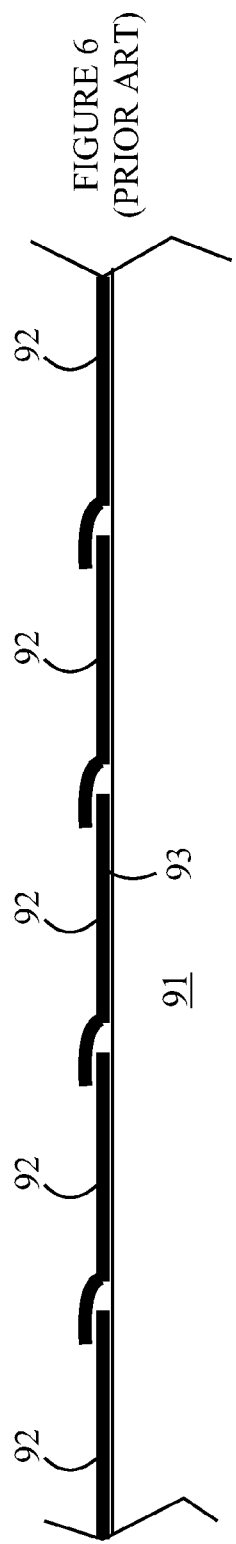
FIG. 6 is a cross-sectional view of a portion of a CCD shift register that is constructed over a silicon substrate.

The above-described embodiments of the present invention assume that CCD shift registers can be implemented in the same CMOS process that is used to fabricate the photodiodes. In conventional CCD shift registers, the electrodes that overlie the channel are constructed by a process in which the electrodes overlap each other at the edges to provide more consistent fringe fields at the edge of the electrodes. Refer now to FIG. 6 which is a cross-sectional view of a portion of a CCD shift register that is constructed over a silicon substrate 91. The electrodes that overlie the channel are shown at 92. These electrodes are typically polysilicon electrodes that are formed on a thin gate insulator 93. The process for providing the overlapping electrodes requires a fabrication process that can provide multiple polysilicon deposition steps. Conventional CMOS fabrication systems that are used for fabricating photodiodes and other logic circuitry typically provide only one polysilicon deposition step. Hence either an augmented CMOS fabrication system must be utilized or some method for providing the electrodes that does not require multiple polysilicon deposition capabilities must be utilized.

Figure 7A:
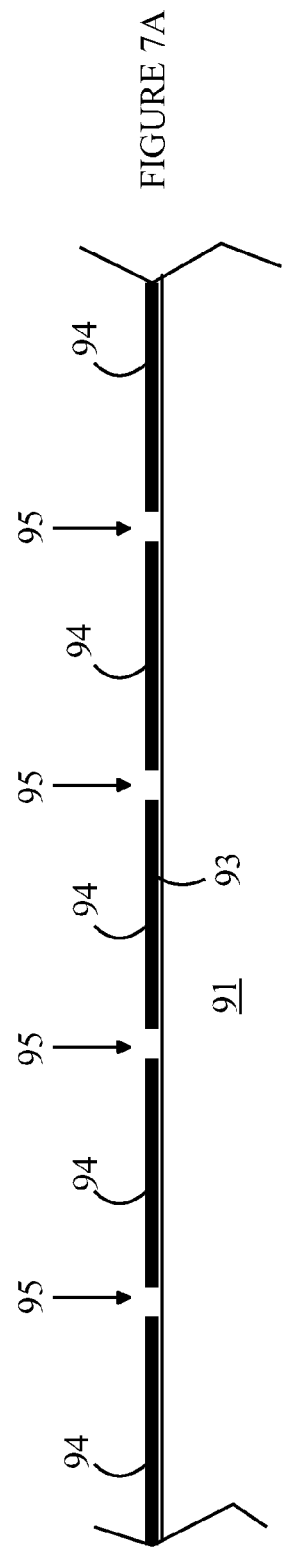
FIGS. 7A-7B illustrate embodiments of CCD shift registers that utilize non-overlapping electrodes.

One aspect of the present invention is based on the observation that as the minimum geometries have decreased in CMOS fabrication systems, it is now possible to implement a CCD shift register using non-overlapping electrodes. Referring now to FIG. 7A, which is a cross-sectional view of a portion of a CCD shift register according to this aspect of the present invention. As can be seen from the figure, the electrodes 94 are separated from one another on the surface of the substrate by a distance 95. This distance can be made sufficiently small so that the fringe fields generated by the electrodes in the gap regions are sufficient to allow the shift register to function in the conventional manner. In one aspect of the present invention, the spacing between adjacent electrodes is 0.3 microns or smaller.

Figure 7B:
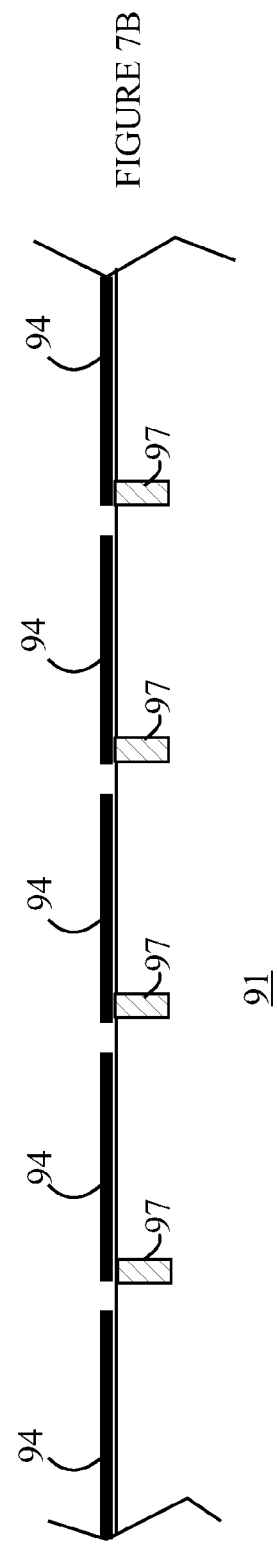

The transfer between shift register stages can be enhanced by utilizing implants under one edge of each electrode. Refer now to FIG. 7B which is a cross-sectional view of a portion of a CCD shift register having implants 97 under each electrode 94. In this embodiment, the implants are p-type regions in an n-type substrate. The implants create a potential gradient which forces the electrons to travel in one direction. The implants reduce the number of electrodes needed in each stage of the CCD shift register.

The column processing circuitry can also include CCD shift registers. Such CCD shift registers are useful in multiplexing the output from a plurality of columns to a single readout circuit. In addition, the shift registers provide a means for combining a plurality of image pixels into a single larger pixel without introducing the noise inherent in making such combinations after the pixels have been converted to voltage values. Referring now to FIG. 8, which illustrates a portion of an imaging array according to one embodiment of the present invention in which the readout circuitry includes a horizontal CCD shift register. Imaging array 110 includes a plurality of pixels 115 that operate in a manner analogous to that described above with reference to FIG. 2. Each column of pixels includes a vertical CCD shift register such as CCD shift register 113 which terminates on a cell of a horizontal CCD shift register 116. For example, CCD shift register 113 terminates on CCD shift register cell 118 of horizontal CCD shift register 116. Each vertical CCD shift register offloads its charge into a corresponding cell of a horizontal CCD shift register 116. Horizontal CCD shift register 116 offloads its charge into a readout circuit 117 that converts the charge to a voltage or digital value. The CCD shift registers are fabricated as channels in the same substrate as the photodiodes.

By adjusting the relative shifting rates between the vertical shift registers and the horizontal CCD shift register 116, the readout circuitry can provide a summing function that allows the charge accumulated in adjacent vertical or horizontal pixels of the image to be combined without requiring that the individual pixel values be readout before being combined. By avoiding the readout process, the readout noise in the combined pixel is substantially reduced.

Consider the case in which a row of pixels is shifted into horizontal CCD shift register 116. Before horizontal CCD shift register 116 is shifted to the left to move a pixel value into readout circuit 117, the contents of CCD shift register cell 119 is shifted into CCD shift register cell 118. Hence, CCD shift register cell 118 will contain the sum of the charges shifted from CCD shift register 113 and CCD shift register 114. Since the charge is added in a lossless manner, the only readout noise will be that introduced by readout circuit 117 in processing this summed charge. Hence, an image in which the width of the pixels is twice as large can be created. Such binning is useful in low light imaging situations, since an image with twice as many photons per pixel is sometimes more useful than an image with half the number of photons and twice the resolution.

Similarly, if two rows of pixel values are shifted into horizontal CCD shift register 116 before the data is shifted into readout circuit 117, the resulting image will have pixels that are twice as long. By combining the binning in both the horizontal and vertical directions, an image with pixels that correspond to "photodiodes" having four times the size of the actual photodiodes in the imaging array can be obtained.

Columns of pixel values can also be combined together in the vertical shift registers if additional transfer gates are provided on the photodiodes in the imaging array. Referring now to FIG. 9, which illustrates another embodiment of an imaging array according to the present invention. Imaging array 130 includes a photodiode array 135 and column processing circuitry comprising a horizontal CCD shift register 151 and readout circuit 137. Photodiode array 135 is constructed from photodiodes having two transfer gates, and hence, each photodiode can be connected to two CCD shift registers. For example photodiode 140 has transfer gates 142 and 143. Transfer gate 142 allows charge that has accumulated in photodiode 141 to be transferred to CCD shift register cell 144 in vertical CCD shift register 153. Similarly transfer gate 143 allows charge that has accumulated in photodiode 141 to be transferred to CCD shift register cell 145 in vertical CCD shift register 154. By transferring the charge accumulated in both of photodiodes 141 and 149 to vertical CCD shift register 153, the light readings provided by photodiodes 141 and 149 are added together. Hence the values received by the column processing circuitry are those that would be generated by a photodiode having twice the area of photodiode 141. Similarly, by adding together horizontal rows of values as discussed above, the values digitized by readout circuit 137 would correspond to an image formed by photodiodes having four times the area of an individual photodiode.

The above-described embodiments of the present invention utilize CCD shift registers to move the output of each pixel sensor to the next pixel sensor that is to process light from the corresponding area of the image without any processing of the charge between shift register stages. In applications that do not use overlapping electrodes in the shift register stages, the charge transfer efficiency could be slightly less than that achieved with the overlapping electrode embodiments. If the number of rows in the imaging array is large, the accumulated loss of charge could be significant, since the loss is an exponential function of the number of stages. If the loss is too great, the number of electrons in the charge packet could reduced to the point that statistical fluctuations in that number could result in image degradation.

Such degradation poses problems in low light portions of the image. If the gain provided by the pixel sensors in a low light region of the image is of the order of the charge loss in the shift register, then the statistical fluctuations introduce significant noise into the measurement of such low level portions of the image. Accordingly, it is advantageous to compensate for charge losses resulting from less than perfect charge transfer efficiency before such losses introduce such statistical fluctuations.

Figure 10:
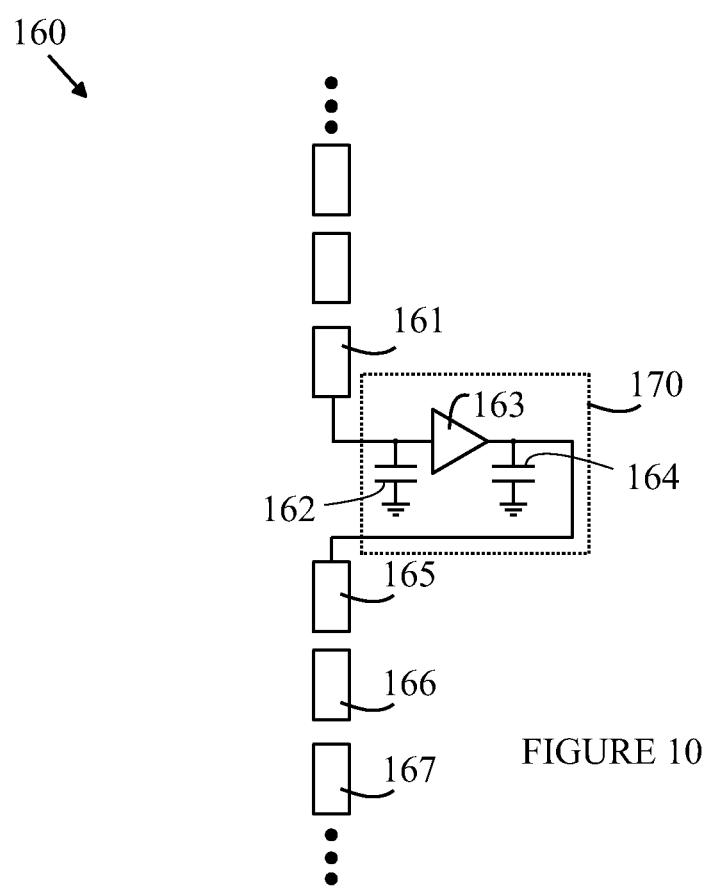
FIG. 10 illustrates a portion of a CCD shift register having an amplifier stage that amplifies the charge being shifted in the CCD shift register.

In one aspect of the present invention, amplifiers are inserted in each CCD shift register between predetermined shift register cells to compensate for charge losses in the shifting operations. Referring now to FIG. 10, which illustrates a portion of a CCD shift register having an amplifier stage inserted therein. CCD shift register 160 includes a plurality of electrodes such as electrodes 161, 165-167. As noted above, the number of electrodes per cell in the shift register depends on the specific clocking scheme used by the shift register. In this embodiment, the amplification stage 170 is inserted between two cells of the CCD shift register, i.e., the last electrode 161 of one of the cells and the first electrode 165 of the following cell in the CCD shift register.

The amplification stage must be a charge amplifier. That is, amplification stage 170 accepts a packet of charge that was moved under electrode 161 and generates an amplified packet of charge that is input to the portion of the shift register under electrode 165. In the embodiment shown in FIG. 10, the amplification stage includes a capacitor 162 that converts the input charge to a voltage, an amplifier 163 which amplifies that voltage, and a capacitor 164 that converts the amplified voltage into an output charge that is transferred to the portion of the shift register under electrode 165.

Ideally, amplification stage 170 just corrects for the charge losses due to the imperfect CCD shift register. The noise introduced by amplification stage 170 increases with the amplification factor provided by the stage. Hence, providing further amplification at these intermediate stages will introduce unnecessary noise into the measurements. In addition, higher levels of amplification could result in charge saturation or overflow in the shift register in regions of the image having a high light intensities.

In some applications, the variation in intensity between the lowest light portions of the image and the brightest portions of the image may be too great to be accommodated in the CCD shift registers. The dynamic range of the imaging array is defined to be the ratio of the largest charge that can be accommodated in a cell of the CCD shift register to the smallest charge that exceeds the noise level introduced by the pixel sensors in the shifting operations. The amplification stages discussed above can improve the smallest charge value. However the amplification stages don't improve the largest charge that can be accommodated.

Consider a bright portion of the image that is processed by one column of pixel sensors. At each pixel sensor, a packet of charge representing the output of the photodiode in that sensor is added to the charge that is already in the corresponding cell of the CCD shift register associated with that column of pixel sensors. If the image is sufficiently bright in this region, a point will be reached in which the CCD shift register cell corresponding to that point in the image can no longer accommodate all of the charge that is to be added into it. At this point, the charge will overflow the CCD shift register channel and the image will essentially be saturated.

The overflowing charge can result in problems for adjacent pixel sensors and CCD shift registers if precautions are not taken to shunt this charge to a drain so that the charge does not reach surrounding electronic components. So-called anti-blooming circuits are known in the CMOS and CCD arts for preventing the image blooming caused by such charge overflows. However such circuits do nothing to prevent the image saturation resulting from the capacity of the CCD shift register cells being exceeded.

In one aspect of the present invention, the charge in predetermined CCD shift register cells is measured at predetermined points along the CCD shift register. If the measured charge is greater than a predetermined threshold value, the charge in that cell is converted to a digital value and the charge in that CCD shift register cell emptied. The digitized value for the charge is then transmitted to the controller, which stores these digitized values and then uses the stored values to arrive at an intensity value for this portion of the image. If the charge in the CCD shift register is less than the threshold value, the charge is coupled to the next cell in the CCD shift register and a value of zero is transmitted to the controller.

The above-described strategy requires that the charge that is moving in the CCD shift register be measured without disturbing the contents of the CCD shift register. Referring now to FIG. 11, which illustrates a circuit that measures the charge moving in the shift register without removing charge from the CCD shift register. FIG. 11 illustrates a section of a CCD shift register 200 having electrodes 201-205. The individual electrodes are connected to control lines which have been omitted from the drawing. These control lines are used to apply voltages to the electrodes during the operation of the CCD shift register. Electrode 203 is connected to an amplifier 208 which is used to measure the potential on electrode 203.

Electrode 203 is a floating node that is characterized by a capacitance 207. To measure the charge moving in CCD shift register 200, electrode 203 is precharged to a known potential by precharge circuit 206 before any charge is shifted under electrode 203. The potential on electrode 203 in this precharge state is measured by the controller using amplifier 208. After the voltage on electrode 203 has been measured, charge is transferred to a portion of the channel under electrode 203 by appropriately gating electrodes 201 and 202 and preventing the charge from moving by the potential on electrode 204. Since the channel under electrode 203 is capacitively coupled to amplifier 208, the charge under electrode 203 causes a change in the potential at the input to amplifier 208. Hence, by again measuring the potential at the input to amplifier 208, the controller can determine how much charge was transferred to the region under electrode 203.

When the charge under electrode 203 has been measured, the charge is transferred by electrodes 204 and 205 to a location under electrode 211. If the controller has determined that the charge is sufficient to convert at this location, the charge under electrode 211 is shifted by electrode 212 into ADC 213 where it is digitized and the results transmitted to the controller. If the charge under 211 is processed in this manner, there will be no charge left under electrode 211. Hence as the CCD shift register continues shifting to the portion of the channel under electrode 210, the shift register will now be empty at this location, and charge can be accumulated once again without causing an overflow in the CCD shift register. If the controller determines that the charge that was under electrode 203 is insufficient to warrant digitization at this point, the controller allows the charge under electrode 211 to continue being shifted down the CCD shift register via electrode 210. In this case the controller merely stores a zero for the charge that has been readout at this location.

At the end of the shifting process, the charge in the final stage of the shift register is digitized as discussed above. At this point the digital values that were provided by the intermediate ADCs are added to the value obtained from the last cell in the shift register. Accordingly, the dynamic range of the imaging array is substantially increased by a factor that depends on the number of intermediate ADCs.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A camera comprising:
    an imaging array comprising a plurality of CMOS pixel sensors organized as a plurality of columns and rows, said columns being characterized by a column direction, each pixel sensor generating a charge in response to an exposure to part of an image, said imaging array receiving an image that moves across said imaging array in said column direction;
    a plurality of CCD shift registers, one such CCD shift register corresponding to each of said columns, each CMOS pixel sensor comprising a first transfer gate that transfers charge accumulated in said pixel sensor to a corresponding cell in said CCD shift register; and
    a controller that controls said CCD shift registers such that charge stored in a first cell in a CCD shift register is moved to a second cell in said CCD shift register where said charge is combined with charge accumulated by said pixel sensor that is connected to said second cell, said combined charge being a measure of light leaving a common location in said moving image.

2. The camera of claim 1 wherein each of said pixel sensors comprises a pinned photodiode.

3. The camera of claim 1 further comprising a column processing circuit that converts a charge shifted off of one of said CCD shift registers to a signal representative of an amount of charge.

4. The camera of claim 3 wherein said column processing circuit comprises a horizontal CCD shift register that shifts charge in a direction parallel to said rows.

5. The camera of claim 3 wherein said controller controls said horizontal CCD shift register such that charges stored in different cells in said CCD shift register are combined prior to said column processing circuit converting said charge to said signal.

6. The camera of claim 1 wherein said pixel sensors in a first one of said columns comprises a second transfer gate that connects said pixel sensor to a corresponding cell in a CCD shift register in a second one of said columns.

7. The camera of claim 6 wherein said controller causes charge accumulated in two different pixel sensors in a row to be combined in one of said CCD shift registers prior to charge in that CCD shift register being shifted in said column direction.

8. The camera of claim 1 wherein said CCD shift registers comprise a plurality of gates overlying a channel in a substrate in which said pixel sensors are also fabricated.

9. The camera of claim 8 wherein said gates are non-overlapping.

10. The camera of claim 9 wherein said gates are separated by less than 0.3 microns.

11. The camera of claim 8 wherein said channel is formed in a semiconductor material of a first conductivity type having an implant of a second conductivity type underlying one edge of a plurality of electrodes.

12. The camera of claim 1 wherein one of said CCD shift registers comprises a charge-to-charge amplifier between two cells of said CCD shift register.

13. The camera of claim 1 further comprising a circuit that measures a charge that is being shifted at a location between two cells of one of said CCD shift registers.

14. The camera of claim 13 further comprising a charge readout circuit that removes charge from said one of said CCD shift registers at a location interior to that CCD shift register and measures said removed charge, said charge being removed in response to said measure charge.

15. A method for generating an image of a moving scene, said method comprising:
providing an imaging array comprising a plurality of CMOS pixel sensors organized as a plurality of columns and rows, said columns being characterized by a column direction, each pixel sensor generating a charge in response to an exposure to part of said moving scene, said moving scene moving across said imaging array in said column direction;
providing a plurality of CCD shift registers, one such CCD shift register corresponding to each of said columns, each CMOS pixel sensor comprising a first transfer gate that transfers charge accumulated in said pixel sensor to a corresponding cell in said CCD shift register;
causing charge stored in a first cell in a CCD shift register to be combined with charge accumulated by said pixel sensor that is connected to a second cell, said combined charge being generated from a common location in said image of the moving scene.

16. The method of claim 15 wherein said pixel sensors comprise pinned photodiodes.

17. The method of claim 15 further comprising converting a charge shifted off of one of said CCD shift registers to a signal indicative of an amount of said charge.

18. The method of claim 17 wherein charge shifted off of a plurality of said CCD shift registers is combined before generating said signal.

19. The method of claim 15 wherein charge accumulated in different columns of said pixel sensors is combined in one of said CCD shift registers.

20. The method of claim 15 further comprising amplifying a charge in one of said CCD shift registers at a location between two cells of said CCD shift register.

21. The method of claim 15 further comprising measuring a charge that is being shifted in one of said CCD shift registers at a location between two cells of one of said CCD shift registers.

22. The method of claim 21 further comprising removing a charge from said one of said CCD shift registers from a location between two cells of said CCD shift register and measuring said removed charge in response to said measuring.

* * * * *